(12) United States Patent
Liu et al.

(10) Patent No.: US 11,942,767 B2
(45) Date of Patent: Mar. 26, 2024

(54) THREADING DEVICE SUITABLE FOR BUILDING ELECTRICAL PIPELINE

(71) Applicant: Taizhou Dawei Electric Appliance Co., Ltd., Taizhou (CN)

(72) Inventors: Ning Liu, Taizhou (CN); Zao Feng, Taizhou (CN); Hao Liu, Taizhou (CN)

(73) Assignee: TAIZHOU DAWEI ELECTRIC APPLIANCE CO., LTD., Taizhou (CN)

( * ) Notice: Subject to any disclaimer, the term of this patent is extended or adjusted under 35 U.S.C. 154(b) by 274 days.

(21) Appl. No.: 17/574,571

(22) Filed: Jan. 13, 2022

(65) Prior Publication Data
US 2022/0140579 A1 May 5, 2022

(30) Foreign Application Priority Data

Dec. 24, 2021 (CN) .......................... 202111601820.2

(51) Int. Cl.
*H02G 1/08* (2006.01)
*H02G 3/03* (2006.01)
*H02G 3/04* (2006.01)
*H02G 9/06* (2006.01)

(52) U.S. Cl.
CPC .............. *H02G 1/088* (2013.01); *H02G 3/03* (2013.01); *H02G 3/0462* (2013.01); *H02G 9/06* (2013.01)

(58) Field of Classification Search
CPC .......... H02G 1/086; H02G 1/08; H02G 1/088; H02G 9/00; H02G 9/02; H02G 9/06; H02G 9/065; H02G 9/08; B08B 1/00; B08B 1/001; B08B 1/02; B08B 1/04; B08B 9/045; E03C 1/30; E03C 1/302; E03C 9/005
See application file for complete search history.

(56) References Cited

U.S. PATENT DOCUMENTS

| 3,244,402 | A | * | 4/1966 | Ensley | ..................... | B08B 9/035 |
| | | | | | | 254/134.3 R |
| 3,837,624 | A | * | 9/1974 | Dandurand | ............ | H02G 1/086 |
| | | | | | | 226/97.1 |
| 2005/0258411 | A1 | * | 11/2005 | Zeitler | .................... | H02G 1/085 |
| | | | | | | 254/134.3 FT |
| 2008/0058980 | A1 | | 3/2008 | Nakano | | |
| 2011/0030605 | A1 | | 2/2011 | Carlson | | |
| 2013/0193111 | A1 | | 8/2013 | Nakagawa et al. | | |

FOREIGN PATENT DOCUMENTS

CN 211829973 U * 10/2020

* cited by examiner

*Primary Examiner* — Tyrone V Hall, Jr.
(74) *Attorney, Agent, or Firm* — Zhigang Ma

(57) ABSTRACT

Disclosed is a threading device suitable for a building electrical pipeline. The threading device comprises a fan, a take-up and pay-off main machine and a connecting hose. A take-up state induction mechanism mainly composed of a bent pipe converging device, a first rotating shaft, a bent pipe converging device lifting spring and a first microswitch is creatively arranged in a ventilation bin. When a strong wire is tightened, the bent pipe converging device is easy to rotate along with tightening of the strong wire, and the strong wire makes contact with the first microswitch in time when being tightened. After the strong wire is loosened, the bent pipe converging device can automatically return under the action of the bent pipe converging device lifting spring, and the take-up state of a wire wheel is recovered.

10 Claims, 4 Drawing Sheets

THREADING DEVICE SUITABLE FOR BUILDING ELECTRICAL PIPELINE

TECHNICAL FIELD

The present disclosure relates to the technical field of threading devices, and specifically relates to a threading device suitable for a building electrical pipeline.

BACKGROUND

Various pipelines of strong current, weak current, fire fighting and the like in constructional engineering are usually pre-buried or exposed in a building structure, when wires and cables are installed in the later period, a threading tool needs to penetrate through the pipelines firstly, then the wires and the cables are pulled through the pipelines, and the tool is a threading device.

In Chinese patent 201922420371.6, disclosed is a wind power lead electrician threading device. The wind power lead electrician threading device comprises a fan, a take-up and pay-off main machine and a connecting hose. When the threading device is in a take-up state, a main shaft applies rotation power to a wire wheel through a displacement shaft and a torsion spring. When a soft strong wire is tightened, the wire wheel stops rotating under tension, the displacement shaft spirally drives the wire wheel to transversely move, and a microswitch is triggered to switch off a power supply of a driver. According to the mode that the strong wire drives the wire wheel to transversely move to trigger the microswitch to switch off the power supply of the driver, the strong tightening force of the strong wire is needed to enable the wire wheel to generate large transverse movement to trigger the microswitch, and the larger the tightening force is, the larger the risk that the driver is damaged is. Therefore, the threading device has the defect that the driver is not closed in time and is easy to damage.

Therefore, the prior art remains to be improved and developed.

SUMMARY

The purpose of the present disclosure is to provide a threading device suitable for a building electrical pipeline so as to solve the problem proposed in the background art.

In order to solve the technical problem, the present disclosure provides the following technical schemes:

A threading device suitable for a building electrical pipeline comprises a fan, a take-up and pay-off main machine and a connecting hose, wherein the take-up and pay-off main machine comprises a ventilation bin, a wire wheel bin and an electrical bin; a fan connector and a hose connector are arranged on the ventilation bin, an air channel communicating with the fan connector and the hose connector is arranged in the ventilation bin, the connecting hose is connected with the hose connector, and the fan is connected with the fan connector; a wire inlet is formed in the side wall of the ventilation bin, a wire outlet of the wire wheel bin communicates with the wire inlet of the ventilation bin, a wire wheel is arranged in the wire wheel bin, and a strong wire is wound on the wire wheel; the electrical bin is tightly attached to the wire wheel bin, the electrical bin and the wire wheel bin are separated through a partition plate, and a wire wheel driving device is arranged in the electrical bin;

a take-up state induction mechanism is arranged in the ventilation bin and comprises a bent pipe converging device; the two ends of the bent pipe converging device face the hose connector and the wire inlet respectively, the end, facing the hose connector, of the bent pipe converging device is rotatably connected with the inner wall of the ventilation bin through a first rotating shaft, a bent pipe converging device lifting spring is arranged on the first rotating shaft; a first microswitch is arranged in the wire outlet of the wire wheel bin, and the first microswitch is connected to a power supply line of the wire wheel driving device;

a wiring channel is arranged in the bent pipe converging device, and a wire end of the strong wire penetrates through the wiring channel and penetrates out of a pipe opening of the connecting hose; when the strong wire is tightened, the bent pipe converging device rotates around the first rotating shaft and makes contact with the first microswitch, the first microswitch is disconnected with the power supply line of the wire wheel driving device, and the wire wheel driving device stops running; and when the strong wire is loosened, the bent pipe converging device is driven by the bent pipe converging device lifting spring to reset, and the first microswitch is connected with the power supply line of the wire wheel driving device.

In an optional mode of execution in the present disclosure, the wire wheel driving device comprises a transmission shaft and a take-up motor, the transmission shaft penetrates through the partition plate, one end of the transmission shaft is connected with the wire wheel, and a driven gear is arranged at the other end of the transmission shaft; and a driving gear is arranged on the take-up motor.

In an optional mode of execution in the present disclosure, a wire wheel driving clutch control device is further arranged in the electrical bin and comprises a motor base and a motor base pushing mechanism; the motor base is rotatably connected to the partition plate; the motor base pushing mechanism comprises a clutch motor, a spiral shaft connected with the clutch motor and a spiral sleeve arranged on the spiral shaft in a sleeving mode; and the spiral sleeve is provided with a fin, a clamping groove is formed in the motor base, and the fin is clamped into the clamping groove.

In an optional mode of execution in the present disclosure, the wire wheel driving clutch control device further comprises a tension spring, a stand column is arranged on the portion, close to the motor base pushing mechanism, of the partition plate, one end of the tension spring is connected with the stand column, the tension spring is hooked on the motor base, and the tension spring is used for pulling the clamping groove in the motor base to rotate towards the fin.

In an optional mode of execution in the present disclosure, brake assemblies are further arranged in the electrical bin and comprise a first electromagnet and a brake pad, the transmission shaft sequentially penetrates through the first electromagnet and the brake pad, the first electromagnet is fixedly arranged on the partition plate, the brake pad is slidably arranged on the transmission shaft, a brake pad reset pull rod is arranged on the transmission shaft, a first pull block and a second pull block are symmetrically arranged on the periphery of the brake pad, and the two ends of the brake pad reset pull rod are connected with the first pull block and the second pull block respectively.

In an optional mode of execution in the present disclosure, the take-up and pay-off main machine further comprises a take-up and pay-off switch circuit, the take-up and pay-off switch circuit comprises a three-gear adjusting operation button, a power supply conversion module, the first microswitch, a second microswitch, a third microswitch, the first electromagnet, the fan, the take-up motor, the clutch motor, a capacitor, a first direct-current relay, a second direct-current relay and a third direct-current relay; the three-gear adjusting operation button has a threading gear, a standby gear and a take-up gear;

when the three-gear adjusting operation button is located at the threading gear, the fan is connected with an external power supply, the first direct-current relay is connected with an internal power supply subjected to voltage reduction through the power supply conversion module, a second electromagnet of the first direct-current relay is powered on, and the second electromagnet is converted to enable a first contact switch of the first direct-current relay to be switched on the capacitor;

when the three-gear adjusting operation button is converted to the standby gear from the threading gear, the fan is powered off, the first direct-current relay is also powered off, the first contact switch of the first direct-current relay is changed to enable the capacitor and the first electromagnet circuit to be connected, and the first electromagnet attracts the brake pad to enable the transmission shaft to stop rotating;

when the three-gear adjusting operation button is switched to the take-up gear from the standby gear, the take-up motor is connected with the internal power supply subjected to voltage reduction through the power supply conversion module; the second direct-current relay and the third direct-current relay are also connected with the internal power supply subjected to voltage reduction through the power supply conversion module, a third electromagnet of the second direct-current relay is powered on, a fourth electromagnet of the third direct-current relay is powered on, a second contact switch of the second direct-current relay is converted to enable a positive electrode of the clutch motor to be connected to a negative electrode of the internal power supply, a third contact switch of the third direct-current relay is converted to enable a negative electrode of the clutch motor to be connected to a positive electrode of the internal power supply, the clutch motor rotates backwards, the motor base is driven by the tension spring to drive the driving gear on the take-up motor to be meshed with the driven gear on the transmission shaft, after the driving gear is meshed with the driven gear, the second microswitch makes contact with the motor base, the second microswitch disconnects the connection between the positive electrode of the clutch motor and the negative electrode of the internal power supply, and the clutch motor is powered off and stops running;

when the three-gear adjusting operation button is switched to the standby gear from the take-up gear, the take-up motor is powered off and stops running; and the second direct-current relay and the third direct-current relay are also powered off, the second contact switch of the second direct-current relay is converted to enable the positive electrode of the clutch motor to be connected to the positive electrode of the internal power supply, the third contact switch of the third direct-current relay is converted to enable the negative electrode of the clutch motor to be connected to the negative electrode of the internal power supply, the clutch motor rotates forwards, the motor base is driven by the motor base pushing mechanism to enable the driving gear on the take-up motor to be separated from the driven gear on the transmission shaft, after the driving gear and the driven gear are separated to a certain distance, the third microswitch makes contact with the motor base, the third microswitch disconnects the connection between the negative electrode of the clutch motor and the negative electrode of the internal power supply, and the clutch motor is powered off and stops running.

In an optional mode of execution in the present disclosure, the power supply conversion module, the second microswitch, the third microswitch, the capacitor, the first direct-current relay, the second direct-current relay and the third direct-current relay are all arranged in the electrical bin, a handle assembly is connected between the electrical bin and the fan, and the three-gear adjusting operation button is arranged on the handle assembly.

In an optional mode of execution in the present disclosure, an observation window is formed in the wire wheel bin at the wire outlet, and a transparent and openable window cover is arranged on the observation window.

In an optional mode of execution in the present disclosure, the pipe opening of the connecting hose is rotatably connected with an air opening pipe, the threading device further comprises at least one pipe nozzle, and the pipe nozzle is detachably connected with a pipe opening of the air opening pipe.

In an optional mode of execution in the present disclosure, D-shaped buckles are arranged on the ventilation bin and the fan.

The present disclosure has the following beneficial effects: disclosed is a threading device suitable for a building electrical pipeline; the threading device comprises a fan, a take-up and pay-off main machine and a connecting hose; a take-up state induction mechanism mainly composed of a bent pipe converging device, a first rotating shaft, a bent pipe converging device lifting spring and a first microswitch is creatively arranged in a ventilation bin; when a strong wire is tightened, the bent pipe converging device is easy to rotate along with tightening of the strong wire, and the strong wire makes contact with the first microswitch in time when being tightened, so that the first microswitch can be disconnected with a power supply line of a wire wheel driving device in time, the wire wheel driving device stops running, and the wheel driving device is prevented from being damaged; and after the strong wire is loosened, the bent pipe converging device can automatically return under the action of the bent pipe converging device lifting spring, and the take-up state of a wire wheel is recovered.

BRIEF DESCRIPTION OF THE DRAWINGS

The attached figures serve to provide further understanding of the present disclosure and constitute a part of the specification, together with embodiments of the present disclosure, serve to explain the present disclosure and do not constitute limitation of the present disclosure. In the attached figures.

Reference signs: 10, fan; 20, take-up and pay-off main machine; 30, connecting hose; 40, ventilation bin; 50, wire wheel bin; 60, electrical bin; 70, fan connector; 80, hose connector; 90, wire inlet; 100, wire outlet; 110, wire wheel; 120, strong wire; 500, partition plate; 130, wire wheel driving device; 140, take-up state induction mechanism; 150, bent pipe converging device; 160, first rotating shaft; 170, bent pipe converging device lifting spring; 180, first microswitch; 190, transmission shaft; 200, take-up motor; 210, driven gear; 220, driving gear; 230, motor base; 240, clutch motor; 250, spiral shaft; 260, spiral sleeve; 270, fin; 280, clamping groove; 290, tension spring; 300, stand column; 310, first electromagnet; 320, brake pad; 330, brake pad reset pull rod; 340, first pull block; 350, torsion spring; 360, torsion spring mounting groove; 370, groove cover; 380, three-gear adjusting operation button; 390, power supply conversion module; 400, second microswitch; 410, third microswitch; 420, capacitor; 430, first direct-current relay; 4301, second electromagnet; 4302, first contact switch; 440, second direct-current relay; 4401, third electromagnet; 4402, second contact switch; 450, third direct-current relay; 4501, fourth electromagnet; 4502, third contact switch; 460, handle assembly; 470, air opening pipe; 480, pipe nozzle; 490, D-shaped buckle; and 530, observation window.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Figure 1:
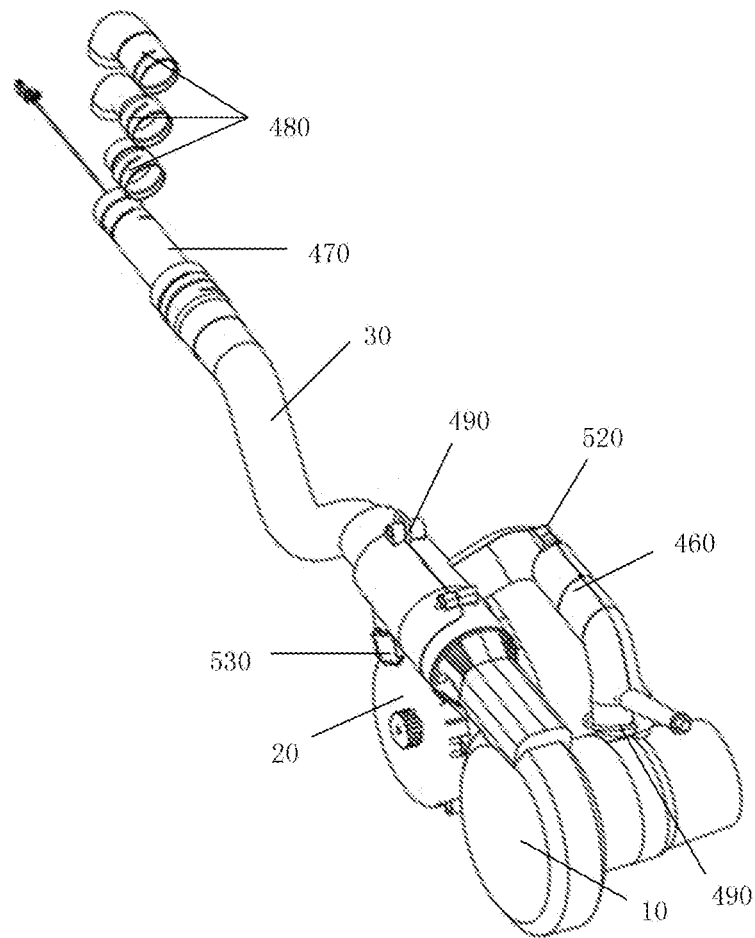
FIG. 1 is a structural schematic diagram of a threading device suitable for a building electrical pipeline in the present disclosure.
Figure 2:
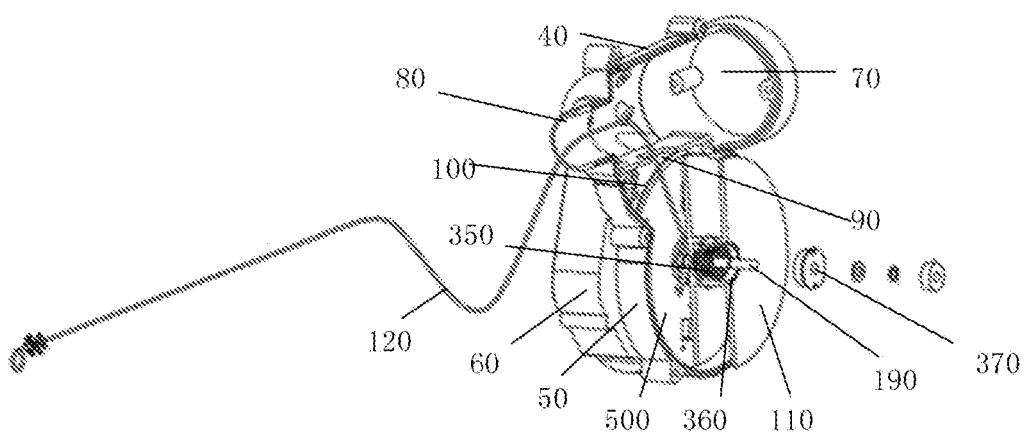
FIG. 2 is a structural schematic diagram of a take-up and pay-off main machine in the present disclosure.
Figure 3:
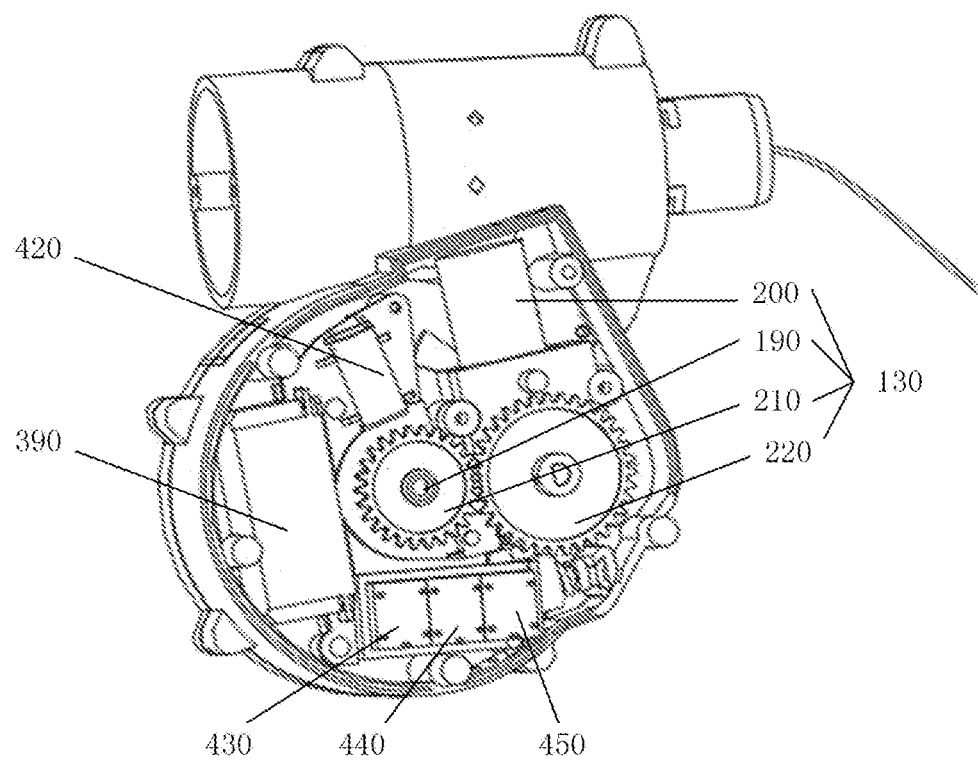
FIG. 3 is an internal structural schematic diagram of an electrical bin in the present disclosure.

Referring to FIG. 1, the present disclosure provides a threading device suitable for a building electrical pipeline, and the threading device comprises a fan 10, a take-up and pay-off main machine 20 and a connecting hose 30. Referring to FIG. 2, the take-up and pay-off main machine 20 comprises a ventilation bin 40, a wire wheel bin 50 and an electrical bin 60; the ventilation bin 40 is arranged above the wire wheel bin 50, a fan connector 70 and a hose connector 80 are arranged on the ventilation bin 40, an air channel communicating with the fan connector 70 and the hose connector 80 is arranged in the ventilation bin 40, the connecting hose 30 is connected with the hose connector 80, and the fan 10 is connected with the fan connector 70; a wire inlet 90 is formed in the side wall of the ventilation bin 40, a wire outlet 100 of the wire wheel bin 50 communicates with the wire inlet 90 of the ventilation bin 40, a wire wheel 110 is arranged in the wire wheel bin 50, and a strong wire 120 is wound on the wire wheel 110; the electrical bin 60 is tightly attached to the wire wheel bin 50, the electrical bin 60 and the wire wheel bin 50 are separated through a partition plate 500, the electrical bin 60 and the wire wheel bin 50 are designed to be separated, and later maintenance is facilitated. Referring to FIG. 3, a wire wheel driving device 130 is arranged in the electrical bin 60, and the wire wheel driving device 130 is used for driving the wire wheel 110 to rotate to take up wires when the threading device is in a take-up mode.

Figure 4:
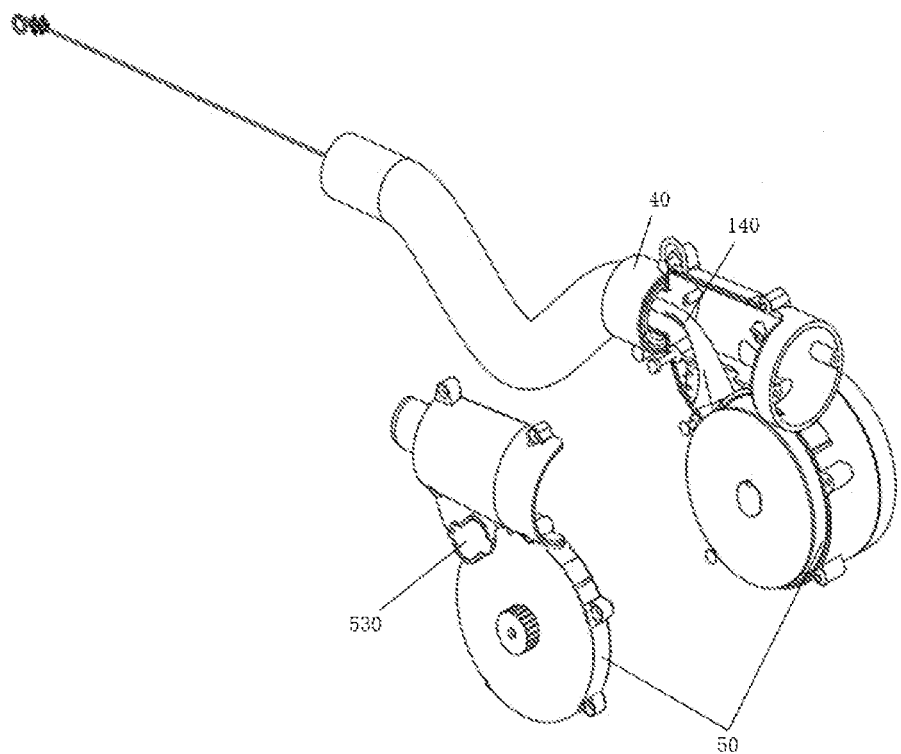
FIG. 4 is a schematic diagram of the set position of a take-up state induction mechanism in the present disclosure.
Figure 5:
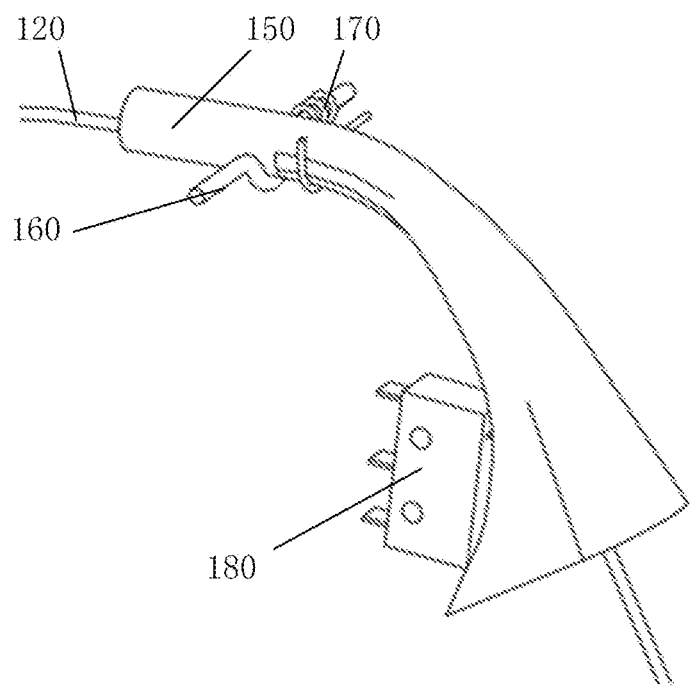
FIG. 5 is a schematic diagram of the mechanism composition of a take-up state induction mechanism in the present disclosure.

Referring to FIG. 4, a take-up state induction mechanism 140 is arranged in the ventilation bin 40. Referring to FIG. 5, the take-up state induction mechanism 140 comprises a bent pipe converging device 150; the two ends of the bent pipe converging device 150 face the hose connector 80 and the wire inlet 90 respectively, namely, the bent pipe converging device 150 is bent in the direction of the wire wheel bin 50, the end, facing the hose connector 80, of the bent pipe converging device 150 is rotatably connected with the inner wall of the ventilation bin 40 through a first rotating shaft 160, a bent pipe converging device lifting spring 170 is arranged on the first rotating shaft 160, a first microswitch 180 is arranged in the wire outlet 100 of the wire wheel bin 50, and the first microswitch 180 is connected to a power supply line of the wire wheel driving device 130; in the present embodiment, the bent pipe converging device 150 comprises a large opening end and a small opening end, the small opening end is connected with the first rotating shaft 160 in a manner that a notch is formed in the middle of the first rotating shaft 160 in a bent manner, and the small opening end is clamped in the notch; the bent pipe converging device lifting spring 170 is a torsion spring, the bent pipe converging device lifting spring 170 is connected to the first rotating shaft 160 in a stringing manner, one end of the bent pipe converging device lifting spring 170 is inserted into the inner wall of the ventilation bin 40, a hook is formed at one end of the bent pipe converging device lifting spring 170, the hook is hung on the small opening end, the large opening end is inserted into the wire inlet 90, the wire inlet 90 is large enough to ensure that the bent pipe converging device 150 has a sufficient rotation angle.

A wiring channel is arranged in the bent pipe converging device 150, and a wire end of the strong wire 120 penetrates through the wiring channel and penetrates out of a pipe opening of the connecting hose 30; when the strong wire 120 is tightened, the bent pipe converging device 150 rotates around the first rotating shaft 160 and makes contact with the first microswitch 180, the first microswitch 180 is disconnected with the power supply line of the wire wheel driving device 130, and the wire wheel driving device 130 stops running; and when the strong wire 120 is loosened, the bent pipe converging device 150 is driven by the bent pipe converging device lifting spring 170 to reset, and the first microswitch 180 is connected with the power supply line of the wire wheel driving device 130. In the present embodiment, the strong wire 120 is then tightened to a certain degree to drive the bent pipe converging device 150 to make contact with the first microswitch 180, and the tightening degree of the strong wire 120 can be achieved by replacing the bent pipe converging device lifting spring 170 with a different elasticity coefficient.

A take-up state induction mechanism mainly composed of a bent pipe converging device 150, a first rotating shaft 160, a bent pipe converging device lifting spring 170 and a first microswitch 180 is creatively arranged in a ventilation bin 40; when a strong wire 120 is tightened, the bent pipe converging device 150 is easy to rotate along with tightening of the strong wire 120, and the strong wire 120 makes contact with the first microswitch 180 in time when being tightened, so that the first microswitch 180 can be disconnected with a power supply line of a wire wheel driving device 130 in time, the wire wheel driving device 130 stops running, and the wheel driving device 130 is prevented from being damaged; and after the strong wire 120 is loosened, the bent pipe converging device 150 can automatically return under the action of the bent pipe converging device lifting spring 170, and the take-up state of a wire wheel 110 is recovered.

Referring to FIG. 3, in an optional mode of execution in the present disclosure, the wire wheel driving device 130 comprises a transmission shaft 190 and a take-up motor 200, the transmission shaft 190 penetrates through the partition plate 500, one end of the transmission shaft 190 is connected with the wire wheel 110, and a driven gear 210 is arranged at the other end of the transmission shaft 190; and a driving gear 220 is arranged on the take-up motor 200. In the present disclosure, the diameter of the driving gear 220 is larger than that of the driven gear 210, the take-up speed of the wire wheel 110 can be adjusted by adjusting the diameter ratio between the driving gear 220 and the driven gear 210, and the diameter of the driving gear 220 is larger than that of the driven gear 210, so that a certain speed reduction effect can be achieved, and the wire wheel 110 is prevented from taking up too quickly.

Figure 6:
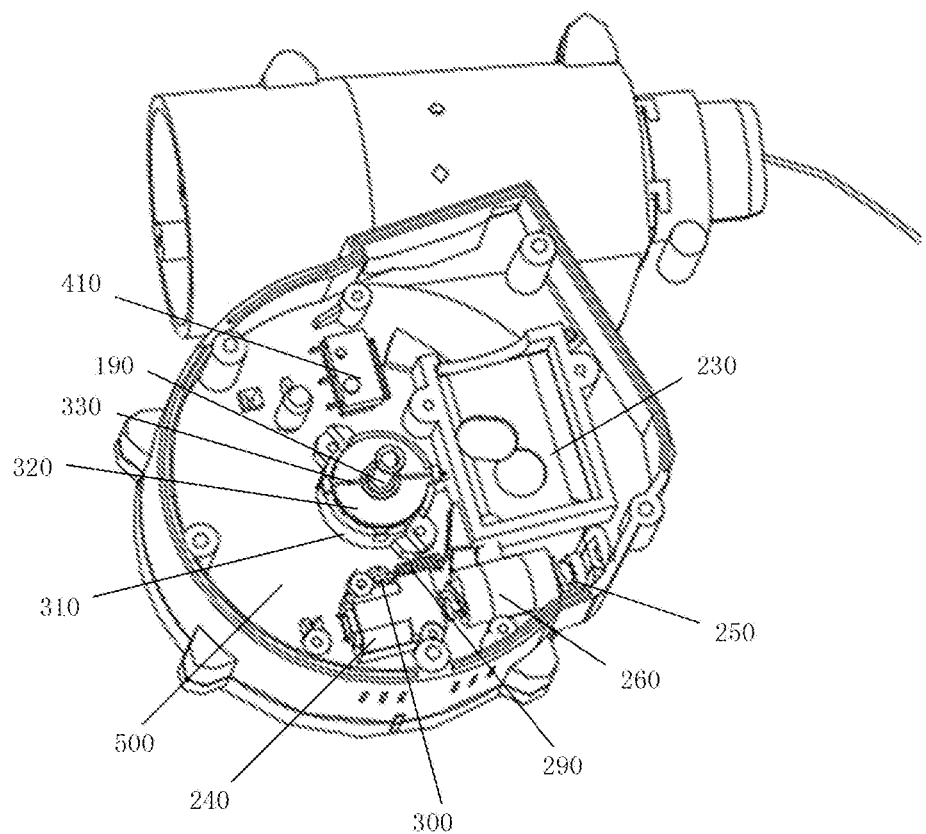
FIG. 6 is a structural schematic diagram of a wire wheel driving clutch control device in the present disclosure.
Figure 7:
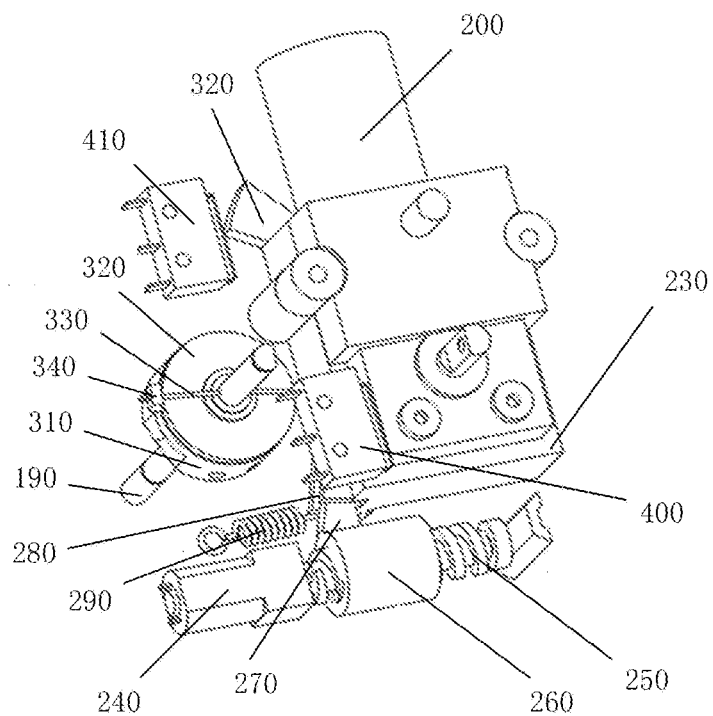
FIG. 7 is a partial internal structural schematic diagram of an electrical bin in the present disclosure.

Referring to FIG. 6 and FIG. 7, in an optional mode of execution in the present disclosure, a wire wheel driving clutch control device is further arranged in the electrical bin 60 and comprises a motor base 230 and a motor base pushing mechanism; the motor base 230 is rotatably connected to the partition plate 500; the motor base pushing mechanism comprises a clutch motor 240, a spiral shaft 250 connected with the clutch motor 240 and a spiral sleeve 260 arranged on the spiral shaft 250 in a sleeving mode; and the motor base pushing mechanism can be replaced by a screw rod motor or a linear motor, the spiral sleeve 260 is provided with a fin 270, a clamping groove 280 is formed in the motor base 230, and the fin 270 is clamped into the clamping groove 280. In an exemplary embodiment of the present disclosure, the motor base 230 is arranged on the right side of the transmission shaft 190, the motor base pushing mechanism is arranged on the lower side of the transmission shaft 190, the fin 270 extends into the clamping groove 280, and the fin 270 and the clamping groove 280 are slidable.

Referring to FIG. 6, in an optional mode of execution in the present disclosure, the wire wheel driving clutch control device further comprises a tension spring 290, a stand column 300 is arranged on the portion, close to the motor base pushing mechanism, of the partition plate 500, one end of the tension spring 290 is connected with the stand column 300, the stand column 300 can be a screw, the tension spring 290 is hooked on the motor base 230, and the tension spring 290 is used for pulling the clamping groove 280 in the motor base 230 to rotate towards the fin 270. In the present embodiment, there is no fixation between the fin 270 and the clamping groove 280, and the tension spring 290 is arranged on the partition plate 500 to tightly connect the fin 270 and the clamping groove 280.

Referring to FIG. 6 and FIG. 7, in an optional mode of execution in the present disclosure, brake assemblies are further arranged in the electrical bin 60 and comprise a first electromagnet 310 and a brake pad 320, the transmission shaft 190 sequentially penetrates through the first electromagnet 310 and the brake pad 320, the first electromagnet 310 is fixedly arranged on the partition plate 500, the brake pad 320 is slidably arranged on the transmission shaft 190, a brake pad reset pull rod 330 is arranged on the transmission shaft 190, a first pull block 340 and a second pull block are symmetrically arranged on the periphery of the brake pad 320, and the two ends of the brake pad reset pull rod 330 are connected with the first pull block 340 and the second pull block respectively. In the present embodiment, the first electromagnet 310 attracts the brake pad 320 to slide downwards after being powered on, the brake pad 320 enables the transmission shaft 190 to stop rotating through friction with the first electromagnet 310, and after the first electromagnet 310 is powered off, the brake pad 320 is separated from the first electromagnet 310 under driving of the brake pad reset pull rod 330.

Referring to FIG. 2, in an optional mode of execution in the present disclosure, a drive buffer mechanism is arranged between the wire wheel 110 and the transmission shaft 190, the drive buffer mechanism comprises a torsion spring 350, a torsion spring mounting groove 360 is formed in the center of the wire wheel 110, a groove cover 370 is arranged at a groove opening of the torsion spring mounting groove 360, and the groove cover 370 is fixedly connected with the wire wheel 110; the torsion spring 350 is arranged in the torsion spring mounting groove 360, the transmission shaft 190 sequentially penetrates through the groove bottom of the torsion spring mounting groove 360, the torsion spring 350 and the groove cover 370, and the groove bottom and the groove cover 370 are movably connected with the transmission shaft 190; one end of the torsion spring 350 is connected with the transmission shaft 190, the other end of the torsion spring 350 is connected with the groove cover 370, and transmission force of the transmission shaft 190 is transmitted to the wire wheel 110 through the torsion spring 350. In the present embodiment, the transmission shaft 190 and the wire wheel 110 are in buffer connection, and the buffer connection has the advantages that after the power failure of the take-up motor 200 is triggered by the strong wire 120, the rotational inertia of the take-up motor 200 can be resolved by the torsion spring 350, the transmission shaft 190 can rotate due to the inertia, and the wire wheel 110 can be stopped immediately, so that the phenomenon that the strong wire 120 is embedded in the wire wheel 110 and consequently paying off is difficult is avoided.

Figure 8:
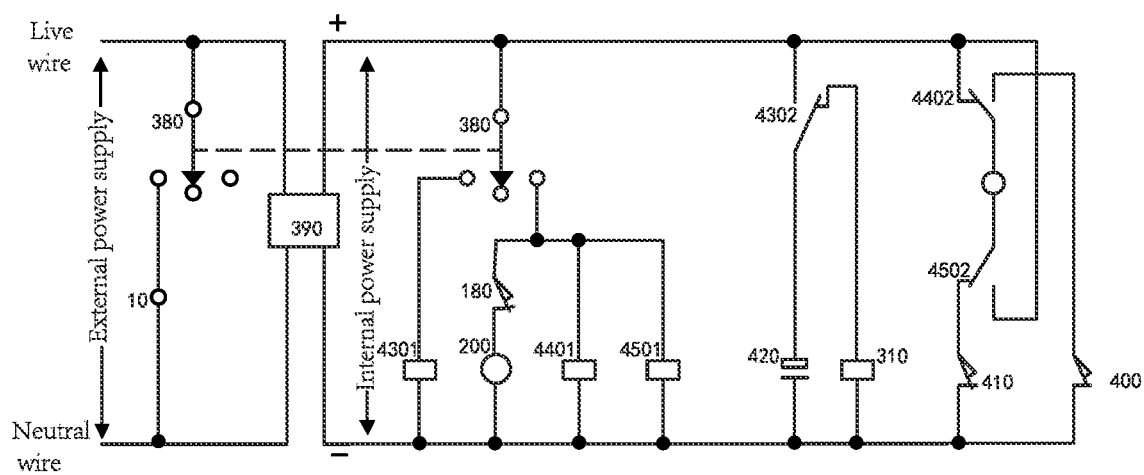
FIG. 8 is a structural schematic diagram of a take-up and pay-off switch circuit in the present disclosure.

Referring to FIG. 8, in an optional mode of execution in the present disclosure, the take-up and pay-off main machine 20 further comprises a take-up and pay-off switch circuit, the take-up and pay-off switch circuit comprises a three-gear adjusting operation button 380, a power supply conversion module 390, the first microswitch 180, a second microswitch 400, a third microswitch 410, the first electromagnet 310, the fan 10, the take-up motor 200, the clutch motor 240, a capacitor 420, a first direct-current relay 430, a second direct-current relay 440 and a third direct-current relay 450; the three-gear adjusting operation button 380 has a threading gear, a standby gear and a take-up gear; and in the present embodiment, the three-gear adjusting operation button 380 is a boat-shaped button, the three-gear adjusting operation button 380 is located at the threading gear when being pressed forwards and is located at the take-up gear when being pressed backwards, and the three-gear adjusting operation button 380 automatically returns to the standby gear after being loosened.

Referring to FIG. 8, when the three-gear adjusting operation button 380 is located at the threading gear, the fan 10 is connected with an external power supply, the first direct-current relay 430 is connected with an internal power supply subjected to voltage reduction through the power supply conversion module 390, a second electromagnet 4301 of the first direct-current relay 430 is powered on, and the second electromagnet 4301 is converted to enable a first contact switch 4302 of the first direct-current relay 430 to be switched on the capacitor 420.

Referring to FIG. 8, the three-gear adjusting operation button 380 is converted to the standby gear from the threading gear, the fan 10 is powered off, the first direct-current relay 430 is also powered off, the first contact switch 4302 of the first direct-current relay 430 is changed to enable the capacitor 420 and the first electromagnet circuit 310 to be connected, and the first electromagnet 310 attracts the brake pad 320 to enable the transmission shaft 190 to stop rotating; and the capacitor 420 discharges electricity to the first electromagnet 310 until electric energy is completely released, the first electromagnet 310 loses the attraction force to release the brake pad 320, and the brake pad 320 resets under the action of the brake pad reset pull rod 330, so that the transmission shaft 190 restores a free state.

Referring to FIG. 8, when the three-gear adjusting operation button 380 is switched to the take-up gear from the standby gear, the take-up motor 200 is connected with the internal power supply subjected to voltage reduction through the power supply conversion module 390; the second direct-current relay 440 and the third direct-current relay 450 are also connected with the internal power supply subjected to voltage reduction through the power supply conversion module 390, a third electromagnet 4401 of the second direct-current relay 440 is powered on, a fourth electromagnet 4501 of the third direct-current relay 450 is powered on, a second contact switch 4402 of the second direct-current relay 440 is converted to enable a positive electrode of the clutch motor 240 to be connected to a negative electrode of the internal power supply, a third contact switch 4502 of the third direct-current relay 450 is converted to enable a negative electrode of the clutch motor 240 to be connected to a positive electrode of the internal power supply, the clutch motor 240 rotates backwards, the motor base 230 is driven by the tension spring 290 to drive the driving gear 220 on the take-up motor 200 to be meshed with the driven gear 210 on the transmission shaft 190, after the driving gear 220 is meshed with the driven gear 210, the second microswitch 400 makes contact with the motor base 230, the second microswitch 400 disconnects the connection between the positive electrode of the clutch motor 240 and the negative electrode of the internal power supply, and the clutch motor 240 is powered off and stops running.

Referring to FIG. 8, when the three-gear adjusting operation button 380 is switched to the standby gear from the take-up gear, the take-up motor is powered off and stops running; and the second direct-current relay 440 and the third direct-current relay 450 are also powered off, the second contact switch 4402 of the second direct-current relay 40 is converted to enable the positive electrode of the clutch motor 240 to be connected to the positive electrode of the internal power supply, the third contact switch 4502 of the third direct-current relay 450 is converted to enable the negative electrode of the clutch motor 240 to be connected to the negative electrode of the internal power supply, the clutch motor 240 rotates forwards, the motor base 230 is driven by the motor base 230 pushing mechanism to enable the driving gear 220 on the take-up motor 200 to be separated from the driven gear 210 on the transmission shaft 190, after the driving gear 220 and the driven gear 210 are separated to a certain distance, the third microswitch 410 makes contact with the motor base 230, the third microswitch 410 disconnects the connection between the negative electrode of the clutch motor 240 and the negative electrode of the internal power supply, and the clutch motor 230 is powered off and stops running.

Referring to FIG. 1 and FIG. 3, in an optional mode of execution in the present disclosure, the power supply conversion module 390, the second microswitch 400, the third microswitch 410, the capacitor 420, the first direct-current relay 430, the second direct-current relay 440 and the third direct-current relay 450 are all arranged in the electrical bin 60, a handle assembly 460 is connected between the electrical bin 60 and the fan, and the three-gear adjusting operation button 380 is arranged on the handle assembly 460.

Referring to FIG. 1 and FIG. 4, in an optional mode of execution in the present disclosure, an observation window 530 is formed in the wire wheel bin 50 at the wire outlet 100, and a transparent and openable window cover is arranged on the observation window 530. The observation window 530 is convenient for observing the storage condition of the wire wheel of the main machine and the working condition of the first microswitch 180, and the observation window 530 can be quickly detached, so that small faults such as entanglement of the strong wire 120 and the like are convenient to maintain.

Referring to FIG. 1, in an optional mode of execution in the present disclosure, the pipe opening of the connecting hose 30 is rotatably connected with an air opening pipe 470, the threading device further comprises at least one pipe nozzle 480, and the pipe nozzle 480 is detachably connected with a pipe opening of the air opening pipe 470. In the present embodiment, the air opening pipe 470 can replace the pipe nozzle 480 to meet the threading requirements of different pipe types and different pipe diameters in different application scenes.

The operation of the threading device is briefly described as follows: during threading, a connecting hose 30 is aligned to a pipeline opening, a three-gear adjusting operation button 380 is pressed to a threading gear, a fan 10 is electrified to work, a strong wire 120 is blown by wind power to enter a pipeline and penetrate out of the other end of the pipeline, the three-gear adjusting operation button 380 is released, and the threading device immediately stops running; during take-up, an electric wire is hung on a wire ring of the strong wire 120 at the other end of the pipeline, the three-gear adjusting operation button 380 is pressed down to a take-up gear, a take-up motor 200 in a take-up and pay-off main machine 20 is electrified to work, the strong wire 120 starts to be automatically taken back, the strong wire 120 can be pulled back through manual assistance in the take-up process, the electric wire is driven to penetrate through the pipeline, and when the strong wire 120 is tightened, a bent pipe converging device 150 rotates to make contact with the first microswitch 180, the take-up motor 200 is disconnected with an internal power supply, the take-up motor 200 automatically stops, and therefore the purpose that the take-up motor 200 automatically stores the strong wire 120 is achieved.

Referring to FIG. 1, in an optional mode of execution in the present disclosure, D-shaped buckles 490 are arranged on the ventilation bin 40 and the fan. In the present embodiment, shoulder straps are connected between the D-shaped buckles 490 in the present disclosure, so that the threading device is convenient to carry and use.

In conclusion, disclosed is a threading device suitable for a building electrical pipeline. The threading device comprises a fan, a take-up and pay-off main machine and a connecting hose. A take-up state induction mechanism mainly composed of a bent pipe converging device, a first rotating shaft, a bent pipe converging device lifting spring and a first microswitch is creatively arranged in a ventilation bin; when a strong wire is tightened, the bent pipe converging device is easy to rotate along with tightening of the strong wire, and the strong wire makes contact with the first microswitch in time when being tightened, so that the first microswitch can be disconnected with a power supply line of a wire wheel driving device in time, the wire wheel driving device stops running, and the wheel driving device is prevented from being damaged; and after the strong wire is loosened, the bent pipe converging device can automatically return under the action of the bent pipe converging device lifting spring, and the take-up state of a wire wheel is recovered.

It needs to be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a device that includes a list of elements not only includes those elements but also includes other elements that are not expressly listed, or further includes elements inherent to such a process, method, article, or device.

Finally, it should be noted that the above description is merely a preferred example of the present disclosure and is not intended to limit the present disclosure. Although the present disclosure is described in detail with reference to the foregoing embodiments, those skilled in the art should understand that they may still make modifications to the technical solutions described in the foregoing embodiments or make equivalent replacements to some technical features thereof. Any modification, equivalent replacement, or improvement made without departing from the spirit and principle of the present disclosure shall fall within the protection scope of the present disclosure.

What is claimed is:

1. A threading device suitable for a building electrical pipeline, comprising a fan, a take-up and pay-off main machine and a connecting hose, wherein the take-up and pay-off main machine comprises a ventilation bin, a wire wheel bin and an electrical bin; a fan connector and a hose connector are arranged on the ventilation bin, an air channel communicating with the fan connector and the hose connector is arranged in the ventilation bin, the connecting hose is connected with the hose connector, and the fan is connected with the fan connector; a wire inlet is formed in the side wall of the ventilation bin, a wire outlet of the wire wheel bin communicates with the wire inlet of the ventilation bin, a wire wheel is arranged in the wire wheel bin, and a strong wire is wound on the wire wheel; the electrical bin is tightly attached to the wire wheel bin, the electrical bin and the wire wheel bin are separated through a partition plate, and a wire wheel driving device is arranged in the electrical bin;

a take-up state induction mechanism is arranged in the ventilation bin and comprises a bent pipe converging device; the two ends of the bent pipe converging device face the hose connector and the wire inlet respectively, the end, facing the hose connector, of the bent pipe converging device is rotatably connected with the inner wall of the ventilation bin through a first rotating shaft, a bent pipe converging device lifting spring is arranged on the first rotating shaft; a first microswitch is arranged in the wire outlet of the wire wheel bin, and the first microswitch is connected to a power supply line of the wire wheel driving device;

a wiring channel is arranged in the bent pipe converging device, and a wire end of the strong wire penetrates through the wiring channel and penetrates out of a pipe opening of the connecting hose; when the strong wire is tightened, the bent pipe converging device rotates around the first rotating shaft and makes contact with the first microswitch, the first microswitch is disconnected with the power supply line of the wire wheel driving device, and the wire wheel driving device stops running; and when the strong wire is loosened, the bent pipe converging device is driven by the bent pipe converging device lifting spring to reset, and the first microswitch is connected with the power supply line of the wire wheel driving device.

2. The threading device suitable for a building electrical pipeline according to claim 1, wherein the wire wheel driving device comprises a transmission shaft and a take-up motor, the transmission shaft penetrates through the partition plate, one end of the transmission shaft is connected with the wire wheel, and a driven gear is arranged at the other end of the transmission shaft; and a driving gear is arranged on the take-up motor.

3. The threading device suitable for a building electrical pipeline according to claim 2, wherein a wire wheel driving clutch control device is further arranged in the electrical bin and comprises a motor base and a motor base pushing mechanism; the motor base is rotatably connected to the partition plate; the motor base pushing mechanism comprises a clutch motor, a spiral shaft connected with the clutch motor and a spiral sleeve arranged on the spiral shaft in a sleeving mode; and the spiral sleeve is provided with a fin, a clamping groove is formed in the motor base, and the fin is clamped into the clamping groove.

4. The threading device suitable for a building electrical pipeline according to claim 3, wherein the wire wheel driving clutch control device further comprises a tension spring, a stand column is arranged on the portion, close to the motor base pushing mechanism, of the partition plate, one end of the tension spring is connected with the stand column, the tension spring is hooked on the motor base, and the tension spring is used for pulling the clamping groove in the motor base to rotate towards the fin.

5. The threading device suitable for a building electrical pipeline according to claim 4, wherein brake assemblies are further arranged in the electrical bin and comprise a first electromagnet and a brake pad, the transmission shaft sequentially penetrates through the first electromagnet and the brake pad, the first electromagnet is fixedly arranged on the partition plate, the brake pad is slidably arranged on the transmission shaft, a brake pad reset pull rod is arranged on the transmission shaft, a first pull block and a second pull block are symmetrically arranged on the periphery of the brake pad, and the two ends of the brake pad reset pull rod are connected with the first pull block and the second pull block respectively.

6. The threading device suitable for a building electrical pipeline according to claim 5, wherein the take-up and pay-off main machine further comprises a take-up and pay-off switch circuit, the take-up and pay-off switch circuit comprises a three-gear adjusting operation button, a power supply conversion module, the first microswitch, a second microswitch, a third microswitch, the first electromagnet, the fan, the take-up motor, the clutch motor, a capacitor, a first direct-current relay, a second direct-current relay and a third direct-current relay; the three-gear adjusting operation button has a threading gear, a standby gear and a take-up gear;

when the three-gear adjusting operation button is located at the threading gear, the fan is connected with an external power supply, the first direct-current relay is connected with an internal power supply subjected to voltage reduction through the power supply conversion module, a second electromagnet of the first direct-current relay is powered on, and the second electromagnet is converted to enable a first contact switch of the first direct-current relay to be switched on the capacitor;

when the three-gear adjusting operation button is converted to the standby gear from the threading gear, the fan is powered off, the first direct-current relay is also powered off, the first contact switch of the first direct-current relay is changed to enable the capacitor and the first electromagnet circuit to be connected, and the first electromagnet attracts the brake pad to enable the transmission shaft to stop rotating;

when the three-gear adjusting operation button is switched to the take-up gear from the standby gear, the take-up motor is connected with the internal power supply subjected to voltage reduction through the power supply conversion module; the second direct-current relay and the third direct-current relay are also connected with the internal power supply subjected to voltage reduction through the power supply conversion module, a third electromagnet of the second direct-current relay is powered on, a fourth electromagnet of the third direct-current relay is powered on, a second contact switch of the second direct-current relay is converted to enable a positive electrode of the clutch motor to be connected to a negative electrode of the internal power supply, a third contact switch of the third direct-current relay is converted to enable a negative electrode of the clutch motor to be connected to a positive electrode of the internal power supply, the clutch motor rotates backwards, the motor base is driven by the tension spring to drive the driving gear on the take-up motor to be meshed with the driven gear on the transmission shaft, after the driving gear is meshed with the driven gear, the second microswitch makes contact with the motor base, the second microswitch disconnects the connection between the positive electrode of the clutch motor and the negative electrode of the internal power supply, and the clutch motor is powered off and stops running;

when the three-gear adjusting operation button is switched to the standby gear from the take-up gear, the take-up motor is powered off and stops running; and the second direct-current relay and the third direct-current relay are also powered off, the second contact switch of the second direct-current relay is converted to enable the positive electrode of the clutch motor to be connected to the positive electrode of the internal power supply, the third contact switch of the third direct-current relay is converted to enable the negative electrode of the clutch motor to be connected to the negative electrode of the internal power supply, the clutch motor rotates forwards, the motor base is driven by the motor base pushing mechanism to enable the driving gear on the take-up motor to be separated from the driven gear on the transmission shaft, after the driving gear and the driven gear are separated to a certain distance, the third microswitch makes contact with the motor base, the third microswitch disconnects the connection between the negative electrode of the clutch motor and the negative electrode of the internal power supply, and the clutch motor is powered off and stops running.

7. The threading device suitable for a building electrical pipeline according to claim 6, wherein the power supply conversion module, the second microswitch, the third microswitch, the capacitor, the first direct-current relay, the second direct-current relay and the third direct-current relay are all arranged in the electrical bin, a handle assembly is connected between the electrical bin and the fan, and the three-gear adjusting operation button is arranged on the handle assembly.

8. The threading device suitable for a building electrical pipeline according to claim 1, wherein an observation window is formed in the wire wheel bin at the wire outlet, and a transparent and openable window cover is arranged on the observation window.

9. The threading device suitable for a building electrical pipeline according to claim 1, wherein the pipe opening of the connecting hose is rotatably connected with an air opening pipe, the threading device further comprises at least one pipe nozzle, and the pipe nozzle is detachably connected with a pipe opening of the air opening pipe.

10. The threading device suitable for a building electrical pipeline according to claim 1, wherein D-shaped buckles are arranged on the ventilation bin and the fan.

* * * * *